(12) United States Patent
Thubert et al.

(10) Patent No.: US 11,044,682 B1
(45) Date of Patent: Jun. 22, 2021

(54) LOCALIZED OPTIMIZATION OF ISOLATED SUB-DAG BASED ON EDGE NODE PARENTING AND DISTRIBUTED DENSITY BASED OPTIMIZATION

(71) Applicant: Cisco Technology, Inc., San Jose, CA (US)

(72) Inventors: Pascal Thubert, Roquefort les Pins (FR); Robert Edgar Barton, Richmond (CA); Jerome Henry, Pittsboro, NC (US); Eric Michel Levy-Abegnoli, Valbonne (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/814,227

(22) Filed: Mar. 10, 2020

(51) Int. Cl.
| | |
|---|---|
| *H04W 24/02* | (2009.01) |
| *H04W 40/24* | (2009.01) |
| *H04W 52/38* | (2009.01) |
| *H04W 84/18* | (2009.01) |

(52) U.S. Cl.
CPC ......... *H04W 52/383* (2013.01); *H04W 24/02* (2013.01); *H04W 40/244* (2013.01); *H04W 84/18* (2013.01)

(58) Field of Classification Search
CPC . H04W 52/383; H04W 24/02; H04W 40/244; H04W 84/18; H04W 84/20; H04W 40/08
See application file for complete search history.

(56) References Cited

U.S. PATENT DOCUMENTS

| | | | |
|---|---|---|---|
| 8,259,635 B2 | 9/2012 | Thubert et al. | |
| 8,392,541 B2 | 3/2013 | Kgarwal et al. | |
| 9,118,539 B2 | 8/2015 | Vasseur et al. | |
| 9,723,538 B2 | 8/2017 | Shaffer et al. | |
| 9,750,022 B2 | 8/2017 | Liu et al. | |
| 10,218,619 B2 | 2/2019 | Hui et al. | |
| 10,491,515 B2 | 11/2019 | Thubert et al. | |
| 10,548,109 B2 | 1/2020 | Webb | |

(Continued)

FOREIGN PATENT DOCUMENTS

KR         101755596 B1     7/2017

OTHER PUBLICATIONS

Internet Engineering Task Force (IETF); RPL: IPv6 Routing Protocol for Low-Power and Lossy Networks—RFC6550 (Year: 2012).*

(Continued)

*Primary Examiner* — Dong-Chang Shiue
(74) *Attorney, Agent, or Firm* — Leon R. Turkevich

(57) ABSTRACT

In one embodiment, a method comprises: determining, by a constrained network device in a low power and lossy network (LLN), a self-estimated density value of neighboring LLN devices based on wirelessly receiving an identified number of beacon message transmissions within an identified time interval from neighboring transmitting LLN devices in the LLN; setting, by the constrained network device, a first wireless transmit power value based on the self-estimated density value; and transmitting a beacon message at the first wireless transmit power value, the beacon message specifying the self-estimated density value, a corresponding trust metric for the self-estimated density value, and the first wireless transmit power value used by the constrained network device for transmitting the beacon message.

14 Claims, 8 Drawing Sheets

(56) References Cited

U.S. PATENT DOCUMENTS

| | | | |
|---|---|---|---|
| 2014/0105015 A1* | 4/2014 | Hui | H04L 47/22 370/230.1 |
| 2014/0204759 A1* | 7/2014 | Guo | H04W 40/04 370/236 |
| 2018/0145841 A1* | 5/2018 | Thubert | H04L 12/1881 |
| 2020/0314005 A1* | 10/2020 | Hanley | H04W 40/248 |

OTHER PUBLICATIONS

Internet Engineering Task Force (IETF); Routing Metrics Used for Path Calculation in Low-Power and Lossy Networks—RFC6551 (Year: 2012).*

Ullah (Energy and congestion-aware routing metric for smart grid AMI networks in smart city) Jul. 13, 2017 (Year: 2017).*

Colas, "Ultra Defense Networks Deployment for beyond 2020 Technologies", Jul. 2017, [online], [retrieved on Dec. 3, 2019]. Retrieved from the Internet: URL: <https://pdfs.semanticscholar.org/a01e/c8a91164233d286a8a025e105b2b2f47b55c.pdf>, 156 pages.

Ullah et al., "Energy and Congestion-Aware Routing Metric for Smart Grid AMI Networks in Smart City", IEEEAccess, Aug. 8, 2017, [online], [retrieved on Dec. 11, 2019]. Retrieved from the Internet: URL: <https://ieeexplore.ieee.org/stamp/stamp.jsp?arnumber=7983339>, pp. 13799-13810.

Fazliu et al., "Distributed Downlink Power Control for Dense Networks with Carrier Aggregation", [online[, ]retrieved on Dec. 3, 2019]. Retrieved from the Internet: URL: <https://arxiv.org/pdf/1708.03115.pdf>, pp. 1-31.

Liu et al., "Interference-Aware Transmission Power Control for Dense Wireless Networks", [online], [retrieved on Dec. 3, 2019]. Retrieved from the Internet: URL: <https://www.cs.cmu.edu/~srini/papers/2007.Seshan.ita.pdf>, pp. 1-7.

Levis et al., "The Trickle Algorithm", Internet Engineering Task Force (IETF), Request for Comments: 6206, Mar. 2011, [online], [retrieved on Dec. 3, 2019]. Retrieved from the Internet: URL: <https://tools.ieff.org/pdf/rfc6206.pdf>, pp. 1-13.

Winter, Ed., et al., "RPL: IPv6 Routing Protocol for Low-Power and Lossy Networks", Internet Engineering Task Force (IETF), Request for Comments: 6550, Mar. 2012, [online], [retrieved on Jan. 31, 2020]. Retrieved from the Internet: URL: <https://tools.ietf.org/pdf/rfc6550.pdf>, pp. 1-157.

Vasseur, Ed., et al., "Routing Metrics Used for Path Calculation in Low-Power and Lossy Networks", Internet Engineering Task Force (IETF), Request for Comments: 6551, Mar. 2012, [online], [retrieved on Dec. 3, 2019]. Retrieved from the Internet: URL: <https://tools.ietf.org/pdf/rfc6551.pdf>, pp. 1-30.

Gnawali et al., "The Minimum Rank with Hysteresis Objective Function", Internet Engineering Task Force (IETF), Request for Comments: 6719, Sep. 2012, [online], [retrieved on Dec. 3, 2019]. Retrieved from the Internet: URL: <https://tools.ietf.org/pdf/rfc6719.pdf>, pp. 1-13.

She et al., U.S. Appl. No. 16/353,137, filed Mar. 14, 2019.
Thubert et al., U.S. Appl. No. 16/535,247, filed Aug. 8, 2019.
Thubert et al., U.S. Appl. No. 16/545,225, filed Aug. 20, 2019.
Thubert et al., U.S. Appl. No. 16/789,862, filed Feb. 13, 2020.

* cited by examiner

US 11,044,682 B1

LOCALIZED OPTIMIZATION OF ISOLATED SUB-DAG BASED ON EDGE NODE PARENTING AND DISTRIBUTED DENSITY BASED OPTIMIZATION

TECHNICAL FIELD

The present disclosure generally relates to localized optimization of an isolated sub-Directed Acyclic Graph (sub-DAG) based on edge node parenting and distributed density-based optimization.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks: such low-power router devices can be referred to as LLN devices, or "RPL nodes" in the case of low-power router devices utilizing the Routing Protocol for Low Power and Lossy Networks (RPL) as described in the Internet Engineering Task Force (IETF) Request for Comments (RFC) 6550. Each LLN node in the LLN typically is constrained by processing power, memory, and energy (e.g., battery power); interconnecting wireless links between the LLN nodes typically are constrained by high loss rates, low data rates, and instability with relatively low packet delivery rates. A network topology (e.g., a "RPL instance") can be established based on creating routes in the form of a directed acyclic graph (DAG) toward a single "root" network device, also referred to as a "DAG root" or a "DAG destination". Hence, the DAG also can be referred to as a Destination Oriented DAG (DODAG). Network traffic moves either "up" towards the DODAG root or "down" towards the DODAG leaf nodes.

The constraints in processing power, memory, and energy in the LLN nodes described above also result in substantial difficulties in effective deployment of a wireless LLN across a large physical region having substantially different physical characteristics, for example deployment in an urban environment comprising closed (indoor) regions such as large-scale office buildings or apartment buildings and large open (outdoor) regions encompassing the closed regions. Hence, substantial difficulties can be encountered in attempting deployment of a portion of the DAG ("sub-DAG") that is isolated from its parent network device by a physical structure, for example an underground "vault" in an apartment building and that comprises hundreds of connected LLN devices implemented, for example, as grid mesh (CG-mesh) based metering devices. Problems include optimizing transmissions within the "vault" in view of node density while being able to establish reliable communications with a parent network devices outside the "vault": LLN nodes confined within the "vault" typically require high transmission power values to communicate with a parent network device positioned or located outside the "vault". However, the high transmission power values used by the LLN nodes inside the "vault" can substantially interfere with neighboring LLN nodes, causing neighboring LLN nodes to "desensitize" their wireless receivers to avoid overloading: such desensitizing can prevent formation of a link layer mesh in the "vault".

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1B:
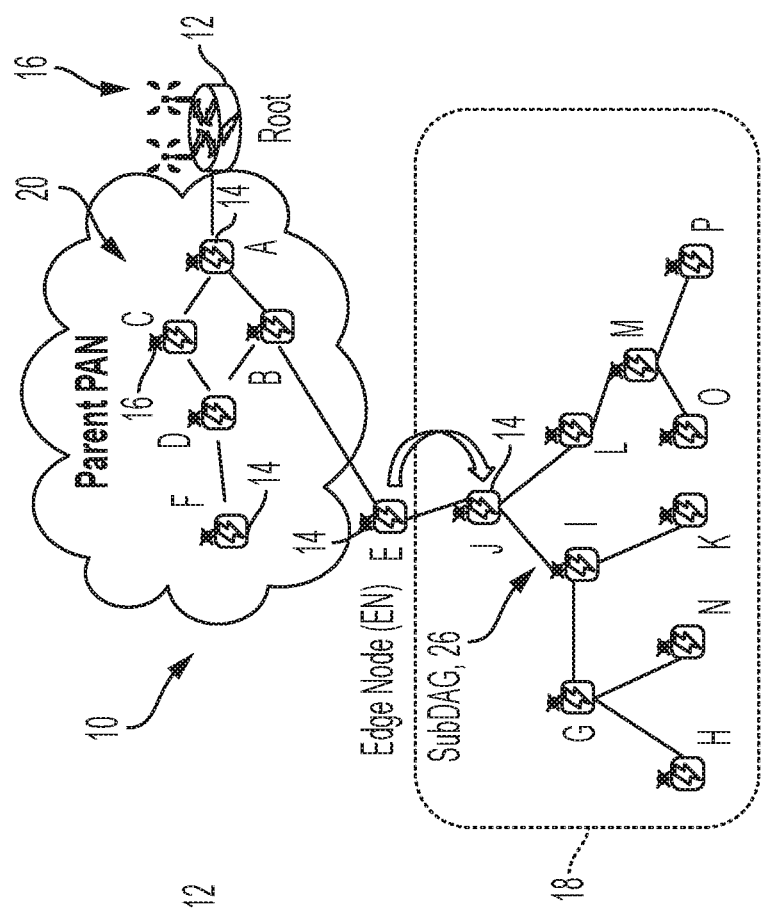
FIGS. 1A and 1B illustrate an example low power and lossy network comprising one or more apparatus for providing localized optimization of an isolated sub-DAG by LLN devices confined within an isolated area in the LLN, according to an example embodiment.

In one embodiment, a method comprises: determining, by a constrained network device in a low power and lossy network (LLN), a self-estimated density value of neighboring LLN devices based on wirelessly receiving an identified number of beacon message transmissions within an identified time interval from neighboring transmitting LLN devices in the LLN; setting, by the constrained network device, a first wireless transmit power value based on the self-estimated density value; and transmitting a beacon message at the first wireless transmit power value, the beacon message specifying the self-estimated density value, a corresponding trust metric for the self-estimated density value, and the first wireless transmit power value used by the constrained network device for transmitting the beacon message.

In another embodiment, a method comprises: attaching, by a network device in a data network, as a child network device to a parent network device of a directed acyclic graph (DAG) rooted by a root network device; detecting, by the network device, a plurality of wireless link quality values for messages received from respective low power and lossy network (LLN) devices confined within an isolated area of the data network, the network device positioned outside the isolated area; identifying, by the network device, one of the LLN devices within the isolated area as having a best of the wireless link quality values and associated with a prescribed sub-network identifier, the sub-network identifier allocated to the network device operable as an edge node between the DAG and the isolated area; and transmitting, by the network device, an instruction to the one LLN device within the isolated area to operate as a subroot for the LLN devices within the isolated area.

In another embodiment, one or more non-transitory tangible media are encoded with logic for execution by a machine and when executed by the machine operable for: determining, by the machine implemented as a constrained network device in a low power and lossy network (LLN), a self-estimated density value of neighboring LLN devices based on wirelessly receiving an identified number of beacon message transmissions within an identified time interval from neighboring transmitting LLN devices in the LLN; setting, by the constrained network device, a first wireless transmit power value based on the self-estimated density value; and transmitting a beacon message at the first wireless transmit power value, the beacon message specifying the self-estimated density value, a corresponding trust metric for the self-estimated density value, and the first wireless transmit power value used by the constrained network device for transmitting the beacon message.

In another embodiment, one or more non-transitory tangible media are encoded with logic for execution by a machine and when executed by the machine operable for: attaching, by the machine implemented as a network device in a data network, as a child network device to a parent network device of a directed acyclic graph (DAG) rooted by a root network device; detecting, by the network device, a plurality of wireless link quality values for messages received from respective low power and lossy network (LLN) devices confined within an isolated area of the data network, the network device positioned outside the isolated area; identifying, by the network device, one of the LLN devices within the isolated area as having a best of the wireless link quality values and associated with a prescribed sub-network identifier, the sub-network identifier allocated to the network device operable as an edge node between the DAG and the isolated area; and transmitting, by the network device, an instruction to the one LLN device within the isolated area to operate as a subroot for the LLN devices within the isolated area.

DETAILED DESCRIPTION

Particular embodiments provide localized optimization of a sub-DAG within an isolated area of a low power and lossy network (LLN) network having a plurality of LLN devices confined within the isolated area and utilizing a DAG-based topology, for example according to the Internet Engineering Task Force (IETF) Request for Comments (RFC) 6550. The particular embodiments optimize communications between the LLN devices confined within the isolated area (e.g., within an underground "vault" in an apartment building or office building) based on enabling each LLN device confined within the isolated area (also referred to as a "confined network device") to determine a self-estimated density value of neighboring LLN devices also confined in the isolated area: each confined LLN device can set its corresponding wireless transmit power value for intra-vault communications within the isolated area, based on the corresponding self-estimated density value.

Hence, the particular embodiments can optimize wireless communications within the isolated area based on each confined LLN device adjusting its intra-vault wireless transmit power value based on its self-estimated density value, ensuring reliable communications within the isolated area without causing desensitizing of receiver circuitry in neighboring LLN devices due to excessive transmission power in densely-populated vaults.

Particular embodiments also provide localized optimization of communications between the LLN devices confined within the isolated area and an external network device in the LLN that is positioned outside the isolated area and attached to a directed acyclic graph (DAG) outside the isolated area in the LLN: the external network device can identify, among the LLN devices confined within the isolated area, one of the confined LLN devices as having the best wireless link quality for reaching the external network device, and in response transmit to the one confined LLN device an instruction to operate as a subroot for formation of a sub-DAG with the confined LLN devices within the isolated area. The external network device also can selectively transmit the instruction at a substantially higher transmit power than used for communications in the LLN outside the confined area. The instruction also an specify a local objective function to be used for formation of the sub-DAG within the confined area that is different than the objective function used by a root of the DAG outside the isolated area. Hence, the external network device can operate as an edge device between the sub-DAG confined within the isolated area, and the DAG outside the isolated area.

Hence, the example embodiments can provide localized optimization of a sub-DAG that is generated by LLN device confined within an isolated area. The example embodiments enable scalable optimization of sub-DAGs within respective isolated areas, with optimized communications with the DAG outside the isolated areas via respective edge devices in the DAG.

Figure 1A:
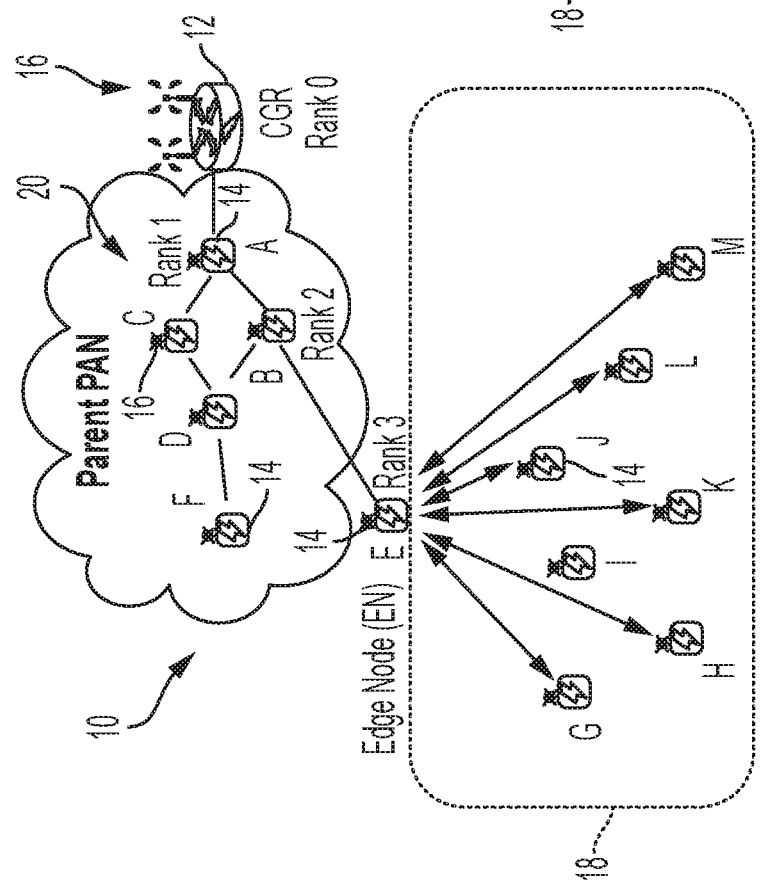

FIGS. 1A and 1B illustrate an example low power and lossy network (LLN) 10 comprising a root network device 12 and LLN devices (e.g., "A" through "P") 14, also referred to as RPL devices or RPL network devices 14, according to an example embodiment. The LLN devices 14 each are configured for communications with the root network device 12 according to a prescribed routing protocol such as the RPL protocol according to RFC 6550.

The LLN 10 can be implemented as an Internet Protocol version 6 (IPv6) wireless radio frequency (RF) mesh network, deployed for example using wireless link layer protocols such as IEEE 802.15.4e, IEEE 802.15.4g (referred to herein as "IEEE 802.15.4e/g"), and/or IEEE 802.15.5. In particular, the LLN 10 can be implemented as a smart grid Advanced Metering Infrastructure (AMI) network that can utilize a connected grid mesh (CG-Mesh) that comprises a field area router (FAR) implemented as a root network device 12 and thousands of LLN devices 14, where each LLN device 14 can possibly reach, within its transmission range of its corresponding wireless data link 16, hundreds of neighboring LLN devices 14. The root network device 12 can be implemented, for example, based on a commercially-available Cisco® Connected Grid Router (CGR) such as the CGR 1000 Series, commercially available from Cisco Systems, San Jose, Calif., modified as described herein. Hence, the root mesh network device 12 also is referred to as a CGR 12, a DAG root 12, a DODAG root 12, or a root network device "CGR" 12.

The root network device 12 is configured for establishing, within the LLN 10, a "Personal Area Network" (PAN) having prescribed PAN identifier (e.g., "X"). The root network device 12 also is configured for generating a DAG-based topology for the PAN based on outputting multicast DODAG information object (DIO) messages, for example according to RFC 6550, enabling the network devices "A" through "F" 14 to establish a DODAG 20 rooted at the root network device 12.

The network devices "A" through "F" 14 can be deployed, as part of an AMI network, within an urban environment as wireless outdoor devices (e.g., "poletop") devices deployed for forwarding network traffic to and from the root network device 12. In contrast, the network devices "G" through "P" are illustrated as confined within an isolated area 18, for example an underground "vault" in a large apartment building or office building. In contrast to the "external" LLN devices "A" through "F" 14 that are outside the isolated vault 18, the "internal" LLN devices "G" through "P" (also referred to herein as the "confined" LLN devices) 14 are confined within the isolated vault 18, for example with multiple layers of steel-reinforced concrete that can isolate the isolated vault 18 several sub-levels below a ground floor of a large (high-rise) building; hence, the isolated vault 18 containing the confined LLN devices 14 may be several sub-levels from the nearest external LLN device "E" 14.

Each wireless RPL network device 14 in the wireless mesh data network 10 normally can join a DODAG 20 (illustrated in FIGS. 1A and 1B as a "Parent PAN") in response to receiving a multicast DIO message (not shown in the Figures) via wireless data links 16 (i.e., under normal wireless conditions providing reliable wireless data links). Each wireless mesh network device 14 can be implemented as a constrained network device, or "LLN device" or "CG-mesh" device, configured for operating for example as a RPL node according to the Internet Engineering Task Force (IETF) Request for Comments (RFC) 6550. Hence, each wireless mesh network device 14 outside the isolated vault 18 typically can establish a DODAG topology 20 overlying the wireless mesh data network 10, described below, that is rooted at the root network device 12.

Each "child" network device (e.g., "A") 14 detecting the multicast DIO message output by the root network device 12 can select the root network device 12 as a parent in the identified DODAG 20 based on comparing network topology metrics (advertised in the multicast DIO message) to a prescribed objective function of the RPL instance. The "child" network device (e.g., "A") 14, upon attaching to its parent, can output its own updated multicast DIO message with updated network topology metrics (e.g., rank identifier "Rank 1") that enable other wireless mesh network devices 14 to discover the DODAG 20, learn the updated network topology metrics, and select a DODAG parent. Hence, the network devices "A" through "F" 14 can join the DODAG 20 in response to receiving a multicast DIO message from an advertising DODAG parent device, and selecting the DODAG parent as a default route.

Downward routes (i.e., away from the DAG root) can be created based on unicast Destination Advertisement Object (DAO) messages that are created by a wireless mesh network device 14 and unicast transmitted to the DAG root 12. In non-storing mode the RPL nodes do not store downward routing tables, hence a RPL node 14 unicasts its DAO message to the DAG root 12, such that all data packets are sent to the DAG root and routed downward with source routes inserted by the DAG root 12.

Figure 3:
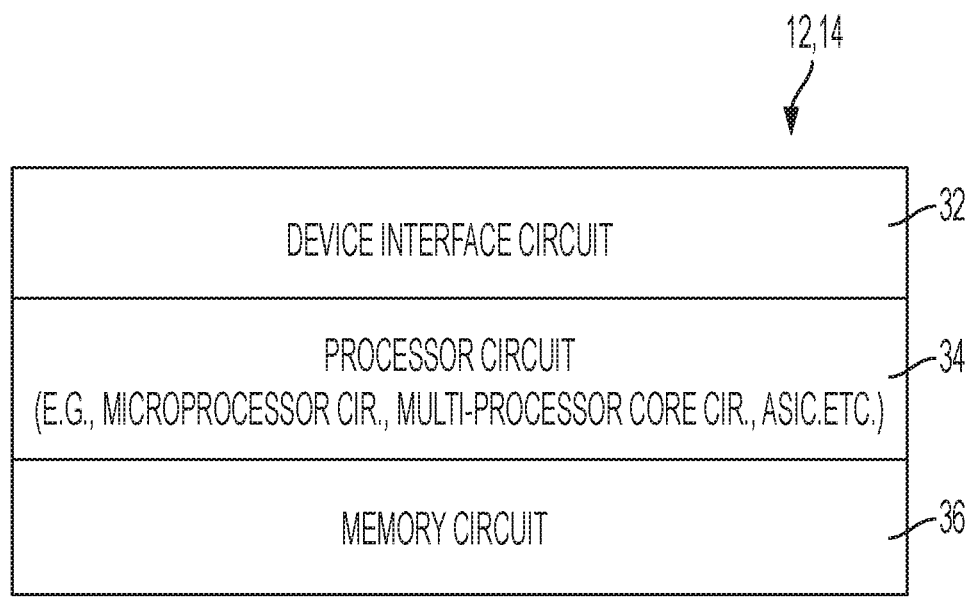
FIG. 3 illustrates an example implementation of any one of the devices of FIG. 1A or 1B, according to an example embodiment.

The DAG root 12, in response to receiving the DAO messages from the RPL nodes 14, can build the entire nonstoring DODAG topology 20 in accordance with RFC 6550, and store the DAG topology in its memory circuit 34 (illustrated in FIG. 3).

Although only the network devices "A", "E", "F", and "J" are labeled with the reference numeral "14" in FIGS. 1A-1B to avoid cluttering in the Figures, it should be apparent that all the network devices "A" through "P" are allocated the reference numeral "14" for purposes of the description herein. Further, it should be apparent that the root network device 12 and all the network devices "A" through "P" 14 are configured for establishing wireless data links 16 (illustrated as radiating from an antenna on each device 12 or 14), even though only the wireless data links for the root network device 12 and network device "C" 14 are labeled with the reference numeral "16" to avoid cluttering in the Figures.

All the network devices, including the root network device 12 and the LLN devices "A" through "P" 14, can output a corresponding routing advertisement message (e.g., a DIO message). Further, all the LLN devices "A" through "P" 12 can have one or more attachments (illustrated in FIGS. 1A-1B as lines in between the network devices 12, 14), where each attachment is used to illustrate an optimized next-hop path chosen for an identifiable objective function.

As described previously, the network devices "G" through "P" 14 are confined within an isolated area 18, for example an underground "vault" in a large apartment building or office building. Hence, the "internal" LLN devices "G" through "P" 14 can encounter substantial difficulties in establishing a reliable link layer mesh network within the isolated vault 18, and attempting to maintain a reliable link layer connection with an external network device (e.g., "E") 14 that is positioned outside the isolated vault 18.

In particular, a particular problem encountered in conventional deployments of prior CG-mesh devices 14 that are confined within an isolated region 18 such as a "vault" is that dense deployment of prior CG-mesh devices 14 can cause substantial problems in attempts to provide a reliable and stable link-layer mesh topology, and a stable DODAG topology overlying the link-layer mesh topology. Prior CG-Mesh network devices, based on 802.15.5 and RPL, have been extensively deployed in utility networks around the world, now numbering into the tens millions of deployed CG-mesh network devices 14. However, mesh performance of a CG-mesh network device is adversely affected in dense metering "farms" installed in an underground vault 18 and containing hundreds of CG-mesh devices. Such metering farms are typically located in subterranean concrete vaults often twenty to thirty meters below ground and often include networks of hundreds of meters, resulting in a relatively high density of CG-mesh devices in the "vault".

The high density of CG-mesh nodes 14 in close proximity to each other causes the prior CG-mesh nodes to typically desensitize their wireless receiver circuitry, since prior CG-mesh nodes by default transmitted at maximum power, causing nearby CG-mesh nodes to desensitize their wireless receiver circuits to avoid overloading receiver circuitry, thereby preventing the mesh from forming properly. Further, the use of high transmission power indoors often leads to more reflections (echoes) causing more loss from multipath fading. Further, the power level of a data packet received inside the vault 18 from a potential parent outside the vault can be substantially attenuated based on the wireless transmission through multiple concrete floors of a building, as opposed to the relatively minimal attenuation in power level of a wireless data packet transmitted by a neighboring CG-mesh device (at maximum power) having a short (e.g., six inches) unobstructed path via an air interface. Hence wireless data packets from a parent network device outside the vault parent (having suffered substantial attenuation during propagation to the isolated vault 18) invariably are lost during a collision with a data packet transmitted at maximum power by an adjacent network device and that encounters minimal attenuation during transmission.

Further, observed behavior of prior deployments of CG-mesh network devices has shown that prior CG-mesh network devices 14 confined within the isolated vault 18 tended to search for a suitable parent outside of the vault 18 as opposed to forming a reliable link-layer mesh inside the vault 18. In most observed cases, all prior CG-mesh network devices formed a connection with the same parent node outside the vault 18, resulting in a sub-optimal star-formation that adversely affected performance and scalability of the link-layer mesh in the meter farm environment within the vault.

Figure 2A:
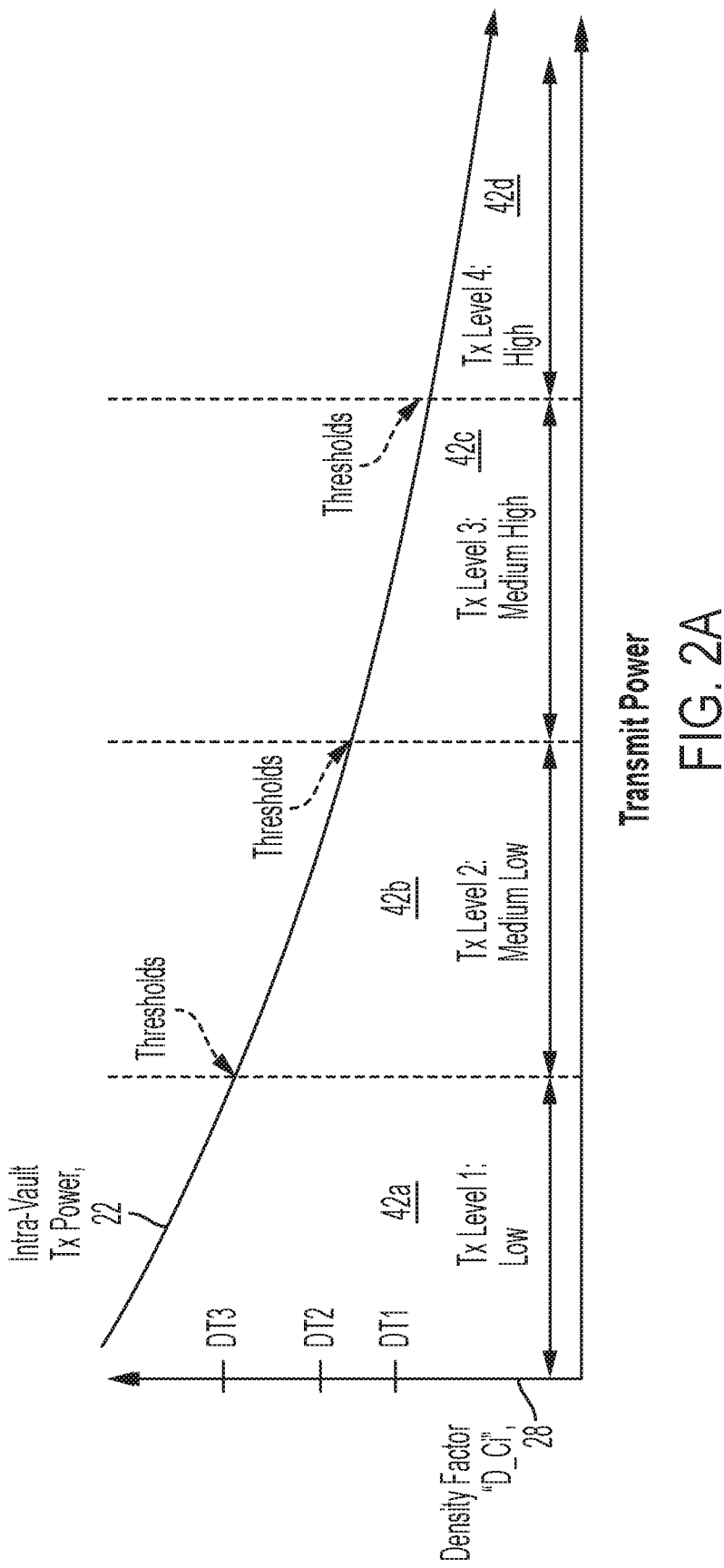
FIGS. 2A and 2B illustrate example setting of wireless transmit power values in the isolated area of FIGS. 1A and 1B based on self-estimated density values of neighboring LLN devices, relative to a transmit power value used to reach an edge node outside the isolated sub-DAG, according to an example embodiment.
Figure 2B:
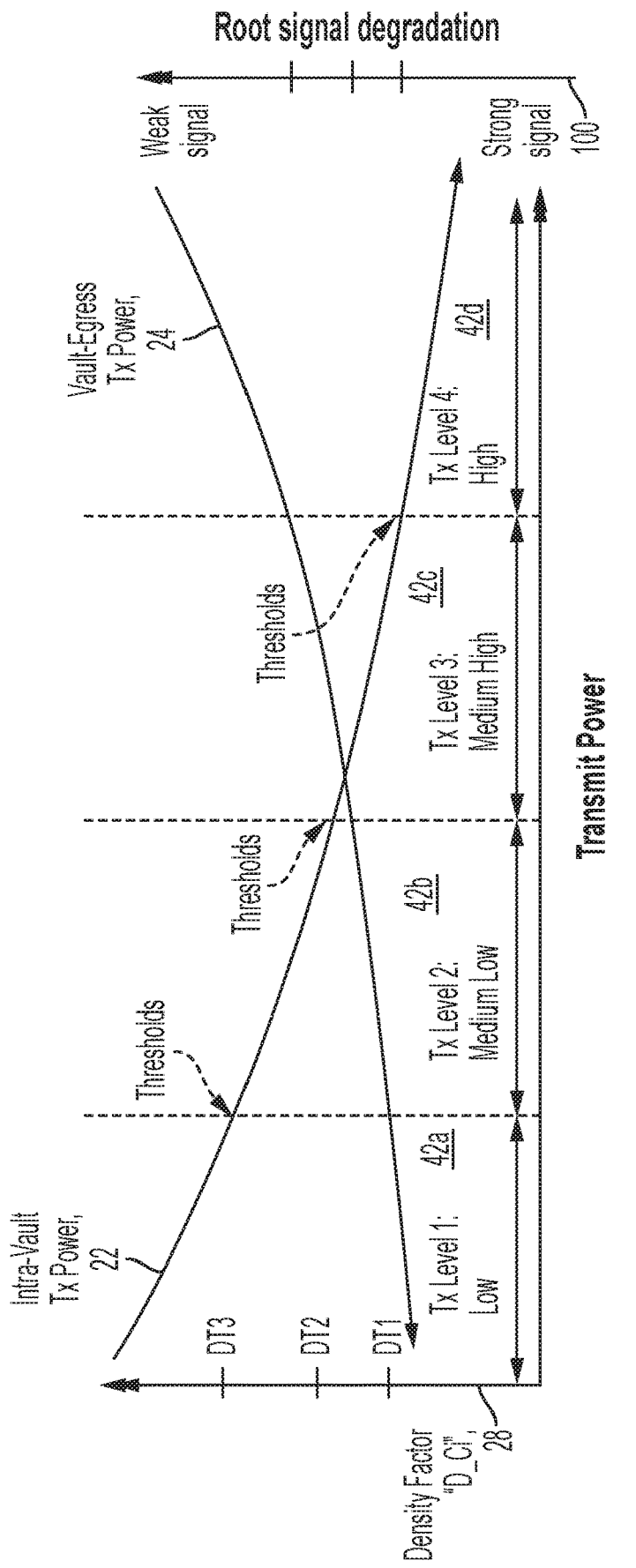

FIGS. 2A and 2B illustrate example setting of wireless transmit power values 22 by the confined LLN devices 14 in the isolated vault 18 of FIGS. 1A and 1B based on self-estimated density values of neighboring LLN devices 14, relative to a transmit power value 24 used to reach an edge node "E" 14 outside an isolated sub-DAG (26 of FIG. 1B) in the isolated vault 18, according to an example embodiment. According to example embodiments, each CG-mesh network device "G" through "P" 14 confined within the isolated vault 18 can automatically adjust its individual wireless transmission ("Tx") power 22 to an optimal minimum wireless transmit power value that enables reliable CG-mesh communications within the isolated vault 18 (also referred to as "intra-vault Tx power"), without desensitizing neighboring CG-mesh network devices in the isolated vault 18 due to excessively high Tx power. Each confined LLN device 14 (or any of the LLN devices 14, as appropriate) can be configured for automatically adjusting its intra-vault Tx power value 22, for a selected wireless channel "Ci", based on the confined LLN device 14 determining its own "self-estimated" density value "D_Ci" (28 of FIG. 6) for the selected wireless channel "Ci" (30 of FIG. 6).

Hence, as opposed to prior deployments that cause a LLN device 14 to initiate communications at maximum transmission power and cause desensitizing of neighboring LLN devices 14, the example embodiments enable each confined LLN device 14 to dynamically adjust its intra-vault Tx power 22 based on the detected density, optimizing rapid and stable formation of a link layer mesh topology in the isolated vault 18 that utilizes one or more wireless channels.

As illustrated in FIGS. 1A and 1B, the example embodiments also provide an edge node "E" 14 that is a member of the DODAG 20 outside the LLN device 14, and that is configured for identifying, from among the confined LLN devices "G" through "P" 14 in the isolated vault 18 an optimum one of the confined LLN devices 14 having the best wireless link quality value for establishment of a sub-DAG 26 associated with a prescribed subnetwork PAN identifier (or "sub-PAN ID") "X-Y" as a subset of the PAN identifier "X" (the symbol "-" in "X-Y" referring to a concatenation operation). The edge node "E" 14 can generate and unicast transmit, to the "optimum" confined LLN device (e.g., "J") 14, an instruction at a substantially higher transmit power to reach the "optimum" confined LLN device (e.g. "J") 14 within the isolated vault 18.

The instruction unicast transmitted by the edge node "E" 14 can cause the "optimum" confined LLN device "J" 14 to operate as a subroot within the isolated vault 18, for generation of the isolated sub-DAG 26 within the isolated vault 18 using its selected intra-vault Tx power 22. As illustrated in FIG. 1B, the "optimum" confined LLN device "J" 14 also can selectively change to a vault-egress Tx power 24 for each data packet transmitted to its parent network device "E" 14, and resume the intra-vault Tx power 22 for transmissions within the isolated vault 18, including localized transmission of a DIO message for formation of the isolated sub-DAG 26.

FIG. 3 illustrates an example implementation of any one of the devices 12, 14 of FIG. 1A or 1B, according to an example embodiment. Each apparatus 12, 14 is a physical machine (i.e., a hardware device) configured for implementing network communications with other physical machines 12, 14 via the network 10. The term "configured for" or "configured to" as used herein with respect to a specified operation refers to a device and/or machine that is physically constructed and arranged to perform the specified operation.

Each apparatus 12, 14 can include a device interface circuit 32, a processor circuit 34, and a memory circuit 36. The device interface circuit 32 can include one or more distinct physical layer transceivers for communication with any one of the other devices 12, 14; the device interface circuit 32 also can include an IEEE based Ethernet transceiver for communications with the devices of FIG. 1 via any type of data link (e.g., a wired or wireless link, an optical link, etc.). The processor circuit 34 can be configured for executing any of the operations described herein, and the memory circuit 36 can be configured for storing any data or data packets as described herein.

Any of the disclosed circuits of the devices 12, 14 (including the device interface circuit 32, the processor circuit 34, the memory circuit 36, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 36) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 36 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 36 can be implemented dynamically by the processor circuit 34, for example based on memory address assignment and partitioning executed by the processor circuit 34.

Figure 4A:
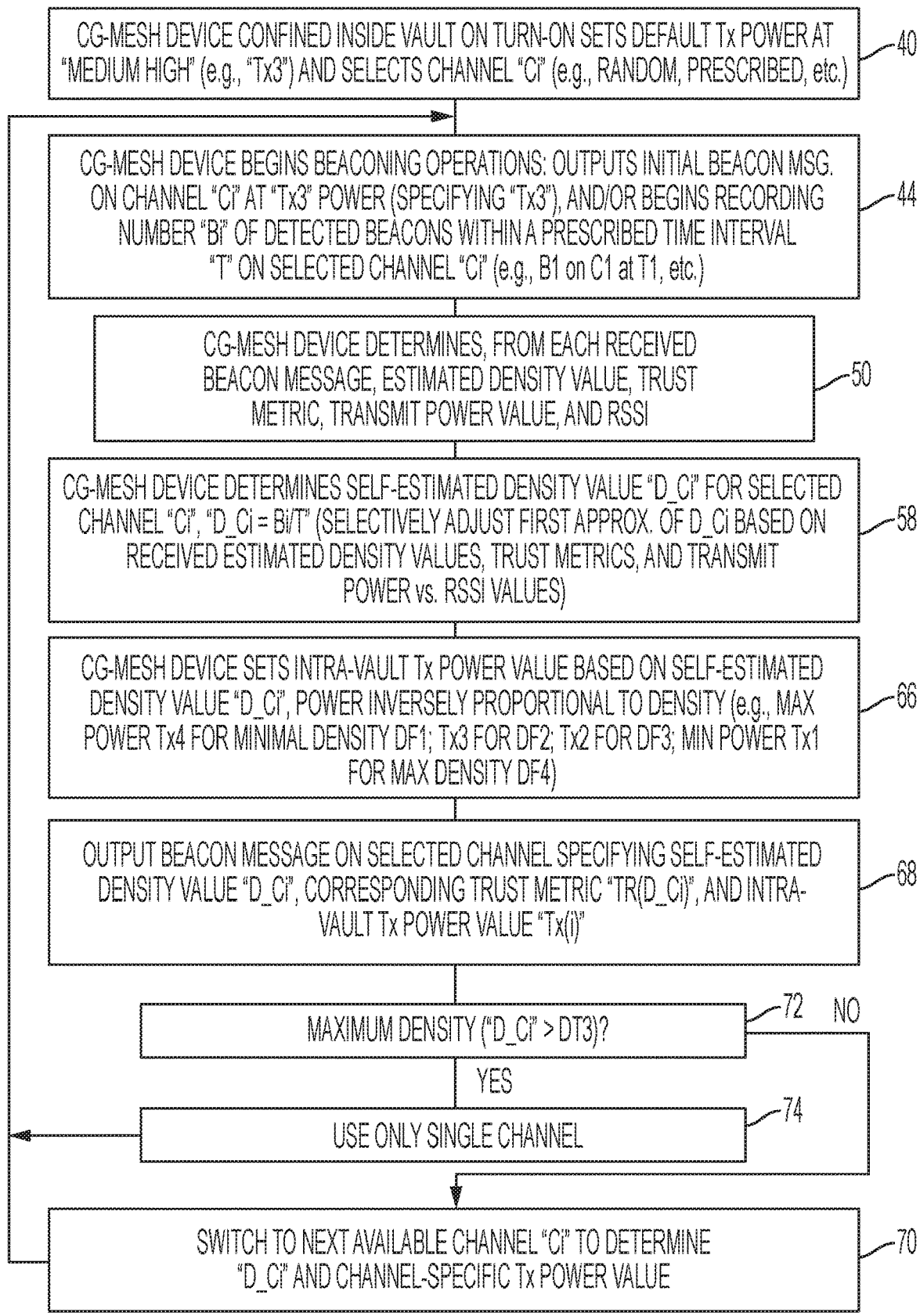
FIGS. 4A-4C illustrate one or more example methods by an apparatus within the isolated area of FIGS. 1A and 1B of executing localized optimization of the isolated sub-DAG based on dynamic adjustment of transmit power relative to a self-estimated density value, according to an example embodiment.
Figure 4B:
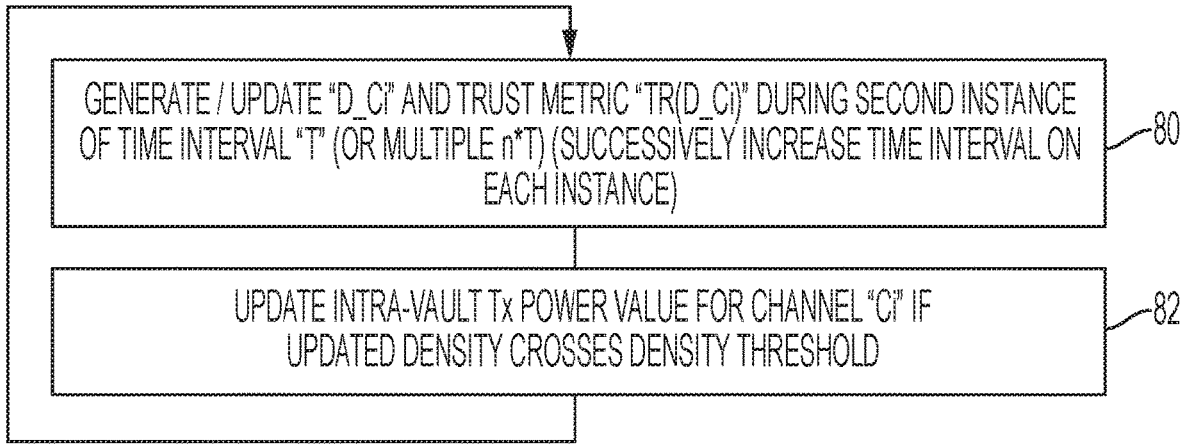
Figure 4C:
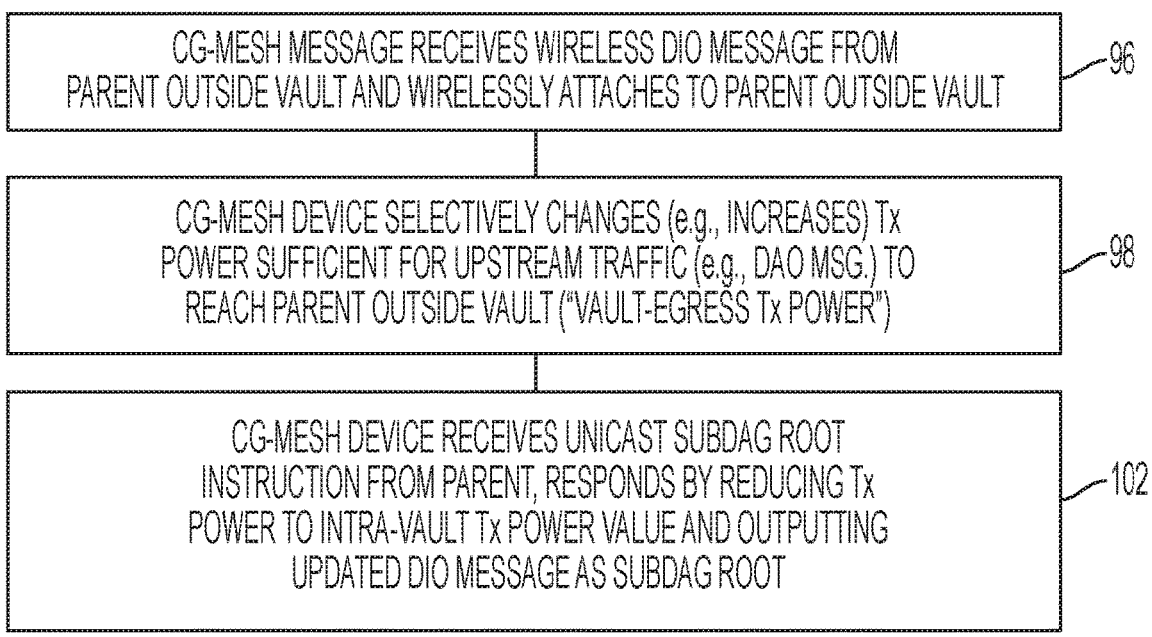

FIGS. 4A-4C illustrate one or more example methods by an apparatus within the isolated area of FIGS. 1A and 1B of executing localized optimization of the isolated sub-DAG based on dynamic adjustment of transmit power relative to a self-estimated density value, according to an example embodiment.

Figure 5:
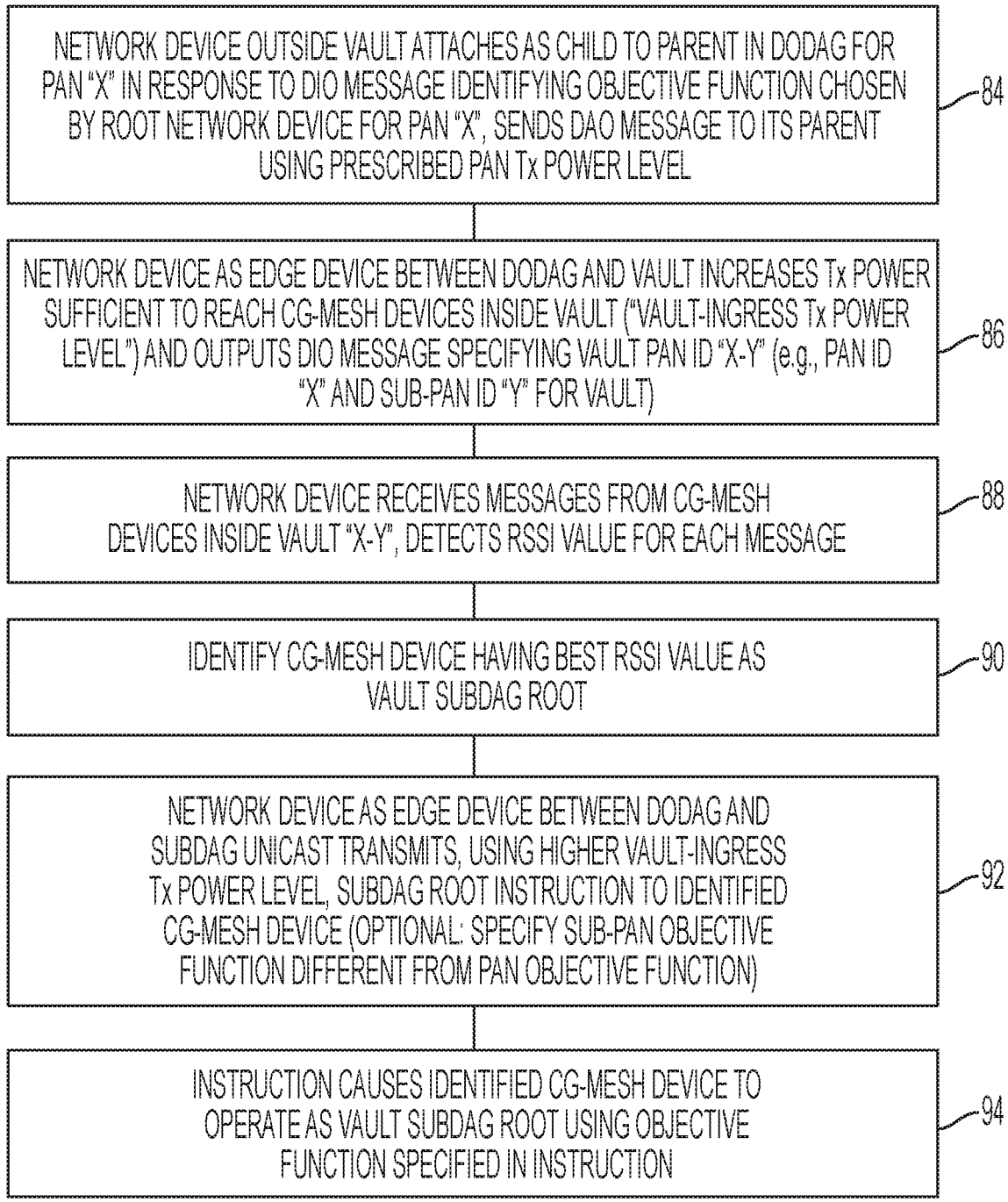
FIG. 5 illustrates an example method by an edge node device outside the isolated area of FIGS. 1A and 1B causing localized optimization of an isolated sub-DAG by LLN devices confined within the isolated area of the LLN, according to an example embodiment.

FIG. 5 illustrates an example method by an edge node device outside the isolated area of FIGS. 1A and 1B causing localized optimization of an isolated sub-DAG by LLN devices confined within the isolated area of the LLN, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 4A, the processor circuit 34 of each confined LLN device 14 in the isolated vault 18 in operation 40 is configured for initially causing the device interface circuit 32 (e.g., at turn-on initialization), to set its transmit power (Tx) power value at a prescribed default value that is less than maximum power: as illustrated in FIGS. 2A and 2B, the transmit power in a device interface circuit 32 can be set at different values, for example a continuously-variable "sliding" transmit power value, or one of a plurality of transmit power ranges 42a, 42b, 42c, or 42d (more or fewer transmit power ranges also can be implemented). Hence, the processor circuit 34 of each confined LLN device 14 in operation 40 can initially set the transmit power value at a medium-high transmit power range 42c for an initially-selected available wireless channel "Ci" 30: the selected wireless channel "Ci" 30 can be randomly selected or selected according to a prescribed instruction stored in the memory circuit 36. In one example, each of the confined LLN devices 14 (and optionally each of the LLN devices 14 outside the isolated vault 18) can be configured for using one or more of prescribed number of available wireless channels in the isolated vault 18 (e.g., channels "A", "B", "C", "D", "E", etc.).

As described below, wireless channel selection can be based on the self-estimated density value "D_Ci" 28 for a selected wireless channel "Ci" 30, such that a determined very low density value can cause the processor circuit 34 of a confined LLN device 14 to use only one of the available channels (e.g., "A") in its list of usable channels, whereas a determined higher density value can cause the processor circuit 34 of the confined LLN device 14 to add another channel (e.g., "B") to its list of usable channels (e.g., use "A" and/or "B"). In one example, each confined LLN device 14 (as well as each LLN device 14 outside the isolated vault 18) can be configured using one or more prescribed available channels, for example according to TSCH, 6TiSCH, etc. In another example, the edge node "E" 14 can supply an instruction to the "optimum" confined LLN device "J" 14 to use a sequence of available channels "A-B-C-D-E" for successive selection of usable channels within the isolated sub-DAG 26 (having the specified sub-PAN ID "X-Y") as a function of increasing density (e.g., "A" only for lowest density; "A" and/or "B" only for low density; "A", "B", and/or "C" only for medium-low density; "A", "B", "C", and/or "D" only for medium density; or "A", "B", "C", "D" and/or "E" only for high density).

The processor circuit 34 of each confined LLN device 14 in operation 44 can begin operations by selectively outputting an initial beacon message on the selected wireless channel "Ci" 30 at the initially-selected wireless transmit power value at the medium-high transmit power range 42c, for example according to the Trickle algorithm as described in RFC 6206. In one example, the processor circuit 34 of each confined LLN device 14 in operation 44 can avoid collisions, using the Trickle algorithm, based on deferring transmission of its initial beacon message until waiting for at least one half of a selected interval.

Any beacon message transmissions detected by the device interface circuit 32 of the confined LLN device 14 also can be counted and recorded in operation 44 by the processor circuit 34, for example as part of the selective transmission according to Trickle. In particular, the processor circuit 34 of each confined LLN device 14 in operation 44 can record the number "Bi" (46 of FIG. 6) of beacons that are detected within a selected detection time interval "T" (48 of FIG. 6). The processor circuit 34 can select the detection time interval "T" 48 using the same time interval or a different time interval than used by the Trickle timer, as appropriate, for example starting with a prescribed minimum detection time interval "T" 48. Hence, the processor circuit 34 of a confined LLN device (e.g., "J") in operation 44 can determine a number "B1" 46 of detected beacons on a selected channel "C1" 30 over a detection time interval "T1", where "i=1" for the selected channel.

Figure 6:
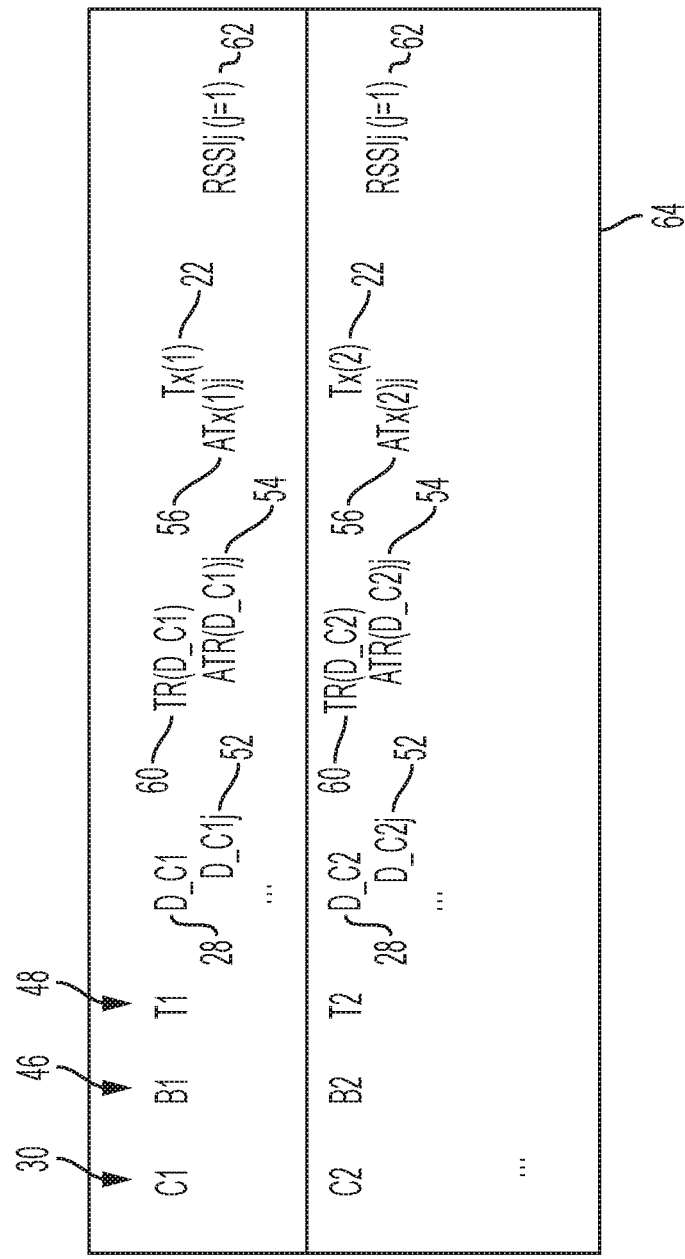
FIG. 6 illustrates an example data structure storing parameters for generation of self-estimated density values for different wireless channels, according to an example embodiment.

As illustrated in FIG. 4A and FIG. 6, the processor circuit 34 of the confined LLN device 14 in operation 50 also can determine and record, from each beacon transmission, a corresponding advertised estimated density value "AD_Cij" 52 that is advertised by a neighboring confined LLN device "j" 14 for the corresponding selected wireless channel "Ci"

30. The received beacon transmission also can specify an advertised trust metric "ATR(D_Ci)j" 54 for the corresponding advertised estimated density value "AD_Cij" 52 and a corresponding advertised transmit power value "ATx(i)j" 56 used by the neighboring confined LLN device "j" 14 on the selected wireless channel "Ci" 30. The device interface circuit 32 of the confined LLN device 14 in operation 50 also can detect a wireless link quality value (e.g., a received signal strength indicator (RSSI)) for the neighboring confined LLN device 14 having transmitted the beacon, and the processor circuit 34 of the confined LLN device 14 in operation 50 can record the wireless link quality value (e.g., RSSI value) 62 within a data structure 64, illustrated in FIG. 6. The data structure 64 can be stored by the processor circuit 34 in the memory circuit 36 of the confined LLN device 14.

Hence, the processor circuit 34 of the confined LLN device 14 in operation 58 can determine at least a first approximation of a self-estimated density value "D_Ci" 28 based solely on the number of detected beacons "Bi" 46 relative to the detection time interval "T" 48, e.g., "D_Ci=Bi/T". The processor circuit 34 of the confined LLN device 14 can set a trust metric "TR(D_Ci)" 60 for the self-estimated density value "D_Ci" 28, for example based on the number of reliable beacon receptions and/or the duration of the detection time interval "T" 48, where a higher trust metric can be allocated for a more statistically accurate evaluation of the number of detected beacons "Bi" 46 over the detection time interval "T" 48, and a lower trust metric can be allocated for a less statistically accurate evaluation of the number of detected beacons "Bi" 46 over the detection time interval "T" 48.

The processor circuit 34 of each confined LLN device 14 in operation 58 also can improve its first approximation of the self-estimated density value "D_Ci" 28 based one or more of the advertised estimated density value "AD_Cij" 52, the advertised trust metric "ATR(D_Ci)j" 54, and the advertised transmit power value "ATx(i)j" 56 specified in one or more beacon messages from neighboring confined LLN devices 14. For example, the processor circuit 34 of each confined LLN device 14 can determine a weighted average of received advertised estimated density values 52. The advertised estimated density values 52 can be weighted based on the respective advertised trust metrics 54, and the wireless "distance" of the neighboring network device, determined as a difference between the advertised transmit power value 56 and the associated RSSI value 62. Hence, neighboring confined LLN devices 14 at a further distance (having a higher difference between the advertised transmit power value "ATx(i)j" 56 and the corresponding RSSI value 62) can be deemed to have a less accurate advertised estimated density value "AD_Cij" 52 (or lower trust value overall in the weighting) than other neighboring confined LLN devices 14 having a closer distance to the confined LLN device 14 determining its self-estimated density value "D_Ci" 28.

In response to determining its self-estimated density value "D_Ci" 28 for the selected wireless channel "Ci" 30, the processor circuit 34 of the confined LLN device 14 in operation 66 can set its intra-vault Tx power "Tx(i)" 22 for the selected wireless channel "Ci" 30, as illustrated in FIGS. 2A and 2B, such that the intra-vault Tx power "Tx(i)" 22 for the selected wireless channel "Ci" 30 is set at lower values in response to higher densities. As illustrated in FIGS. 2A and 2B, the processor circuit 34 of the confined LLN device 14 can set the intra-vault Tx power 22 of the device interface circuit 32: within the maximum transmit power range "Tx4" 42d if the self-estimated density value "D_Ci" 28 is a minimal density "DF1" (e.g., below the density threshold "DT1"); within the medium-high transmit power range "Tx3" 42c if the self-estimated density value "D_Ci" 28 is a medium-low density "DF2" (e.g., in between the density thresholds "DT1" and "DT2"); within the medium-low transmit power range "Tx2" 42b if the self-estimated density value "D_Ci" 28 is a medium-high density "DF3" (e.g., in between the density thresholds "DT2" and "DT3"); or within the low transmit power range "Tx1" 42a if the self-estimated density value "D_Ci" 28 is a high density "DF4" (e.g., above the density threshold "DT3"). More precise tuning of the intra-vault Tx power 22 also can be used based on the processor circuit 34 applying the self-estimated density value "D_Ci" 28 to a nonlinear function configured for determining the appropriate intra-vault Tx power 22 for the identified self-estimated density value "D_Ci" 28, as appropriate.

Hence, the processor circuit 34 of the confined LLN device 14 in operation 68 can cause the device interface circuit 32 to output a beacon message on the selected wireless channel "Ci" 30 (e.g., according to Trickle), where the beacon message generated by the processor circuit 34 can specify the self-estimated density value "D_Ci" 28, the corresponding trust metric "TR(D_Ci)" 60, and the corresponding intra-vault Tx power "Tx(i)" 22 used by the device interface circuit 32 for transmission of the beacon on the selected wireless channel "Ci" 30. Hence, the transmission of the beacon message by the confined LLN device 14 enables neighboring confined LLN devices 14 to detect the confined LLN device 14 for establishment of the link layer mesh topology in the isolated vault 18, without desensitizing the neighboring confined LLN devices 14 due to excessive transmit power, and further enables the neighboring confined LLN devices 14 to more precisely determine the density based on the transmitted self-estimated density value "D_Ci" 28, the transmitted trust metric "TR(D_Ci)" 60, and the transmitted value of the intra-vault Tx power 22.

Following transmission of the beacon message, the processor circuit 34 of the confined LLN device 14 can wait for other beacon transmissions to further update its self-estimated density value "D_Ci" 28 (described below with respect to FIG. 4B), or can switch to another wireless channel "Ci+1" in operation 70 to selectively determine another self-estimated density value "D_Ci" 28 for another selected wireless channel "Ci" 30 (e.g., "i=i+1", moving from wireless channel "A" to "B"). In one example, the processor circuit 34 of the confined LLN device 14 can choose to use only the initial channel (e.g., "A") if the self-estimated density value "D_CA" 28 for channel "A" is a minimum density value, ensuring that all confined LLN devices 14 can communicate on the same channel for formation of a reliable link layer mesh topology in the isolated vault 18. Additional wireless channels can be used (e.g., "B") as the self-estimated density value "D_Ci" 28 increases for the initial channel "A", enabling a confined LLN device 14 to use a less-dense channel "B", while switching back to channel "A" for communication with other confined LLN devices 14 using only the initial channel "A", followed by use of another channel "C" for communication with confined LLN devices 14 on channels "A", "B", and/or "C", etc.

Hence, each of the confined LLN devices 14 can be configured for switching between different available wireless channels, as desired, in order to distribute the number of confined LLN devices 14 in the isolated vault 18; in this example, the confined LLN devices 14 can establish multiple instances of the wireless mesh network (and associated isolated sub-DAG 26) based on different groups of the confined LLN devices 14 using different wireless channels that are orthogonal to each other; the different groups of the confined LLN devices 14 also can switch, at prescribed time intervals, to a different frequency channel, enabling the different groups to use the same frequency channels according to different rotation groups, where device group "1" starts with the channel sequence "A-B-C-D" (changing every few seconds, for example), device group "2" starts with the channel sequence "B-C-D-A" (also changing every few seconds, for example), etc.

Depending on implementation, the processor circuit 34 of the confined LLN device 14 may determine in operation 72 that if a maximum density is encountered on one or more of the available wireless channels, the processor circuit 34 of the confined LLN device 14 can either avoid use of the channel having the maximum density, or can select in operation 74 use of only a single wireless channel in operation 74, for example using only one wireless channel showing the lowest channel density. The one or more available wireless channels used by the confined LLN devices 14 in the isolated vault 18 can be the same or different than the parent-child link used by the edge node "E" 14 for parent-child communications with a child network device (e.g., the "optimum" confined LLN device "J" 14) in the isolated vault 18, described below.

As illustrated in FIG. 4B, the processor circuit 34 of a confined LLN device 14 in operation 80 can update its self-estimated density value "D_Ci" 28 and corresponding trust metric "TR(D_Ci)" 60 during a second instance of the detection time interval "T" 48, for example based on repeating operations 44 through 68 of FIG. 4A. The processor circuit 34 of the confined LLN device 14 in operation 80 also can use a successively-increasing time interval for each instance of the detection time interval "T" 48 (e.g., increase from an initial time interval of 200 seconds at network initialization to 2000 seconds after convergence), enabling the processor circuit 34 of the confined LLN device 14 to generate an updated self-estimated density value "D_Ci" 28 in operation 80, and adjust in operation 82 the intra-vault Tx power 22 to an updated transmit power value based on the updated self-estimated density value "D_Ci" 28, for example if the updated density crosses one of the density thresholds "DT" illustrated in FIGS. 2A and 2B.

Hence, the example embodiments enable rapid convergence of a link layer mesh network by the confined LLN devices 14 in the isolated vault 18, based on limiting the intra-vault Tx power 22 based on the self-estimated density value "D_Ci" 28 on a selected wireless channel "Ci" 30. The link layer mesh network can be established by the confined LLN devices 14 in the isolated vault 18 either before or during formation of the isolated sub-DAG 26 initiated by the edge node "E" 14, described below.

In a variation of the above description with respect to FIGS. 4A and 4B, a confined LLN device 14 also can rapidly send beacons on "n" different channels and then select one of the "n" channels for listening for transmitted beacons by neighboring confined LLN devices 14 on the selected channel. As the self-estimated density value "D_Ci" 28 is updated, the confined LLN device 14 can reduce its selected channels "n" to reduce collisions (e.g., from channels "A", "B", "C", and "D" to "A", "B", and "C" only). The confined LLN device 14 in operation 68 also can specify the number "n" of selected channels in the beacon message.

FIG. 5 illustrates an example method by the edge node "E" 14 of FIGS. 1A and 1B that is outside the isolated vault 18 causing localized optimization of an isolated sub-DAG 26 by the confined LLN devices 14 confined within the isolated area 18 of the LLN 10, according to an example embodiment. The edge node "E" 14 in operation 84 can attach as a child to a parent network device "B" 14 for reaching the root network device 12, for example in response to receiving a DIO message according to RFC 6550. The DIO message originated by the root network device 12 can specify a PAN identifier "X" for the DODAG 20 and a prescribed objective function for joining the DODAG 20. The processor circuit 34 of the edge node "E" 14 can communicate with its parent network device "B" 14 based on sending messages (e.g., a DAO message) according to a prescribed PAN transmission power level configured in the edge node "E" 14 or set by the root network device 12 and specified within a DIO message.

According to an example embodiment, an edge device such as the edge node "E" 14 is configured in the LLN 10 to communicate with an isolated sub-DAG 26 in an isolated vault 18. In particular, each edge node in the LLN 10 is positioned outside one or more isolated vaults 18 and is configured for transmitting in operation 86 one or more instruction messages (e.g., DIO messages, described below) into the one or more isolated vaults 18 at a substantially higher transmit power ("Vault-Ingress Tx Power Level") than the corresponding PAN transmission power level used for communications in the DODAG 20. The substantially-higher transmit power ("Vault-Ingress Tx Power Level") is sufficient to overcome any attenuation encountered during propagation to reach at least one of the confined LLN devices 14 in the isolated vault 18 (e.g., through the multiple levels of steel-reinforced concrete between the edge node "E" 14 and the isolated vault 18).

Hence, the edge node "E" 14 provides wireless range extension capabilities for one or more instances of the isolated sub-DAG 26 in the isolated vault 18 on one or more wireless channels used for transmissions into and out of the isolated vault 18. The DIO message generated and output by the edge node "E" 14 can specify a sub-PAN ID "X-Y", for example "123-4567", where the PAN ID "X=123" as set by the root network device 12, and the sub-PAN ID suffix allocated to the specific isolated vault 18 "Y=4567" can be set by the edge node "E" 14, the root network device 12, or a network administrator managing the LLN 10 via the root network device 12. Note that a non-DIO message also can be transmitted in operation 86 by the edge node "E" 14 into the isolated vault 18.

As illustrated in FIG. 1A, the confined LLN devices 14 in the isolated vault 18 can respond to the detection of the DIO message (or non-DIO message) by unicast transmitting in operation 88 respective responses to the edge node "E" 14, for example at a "Vault-Egress Tx Power" that is sufficient for the response to reach the edge node "E" 14 (e.g., overcoming the attenuation encountered through the multiple levels of steel-reinforced concrete in between the isolated vault 18 and the edge node "E" 14). As described previously, the confined LLN devices 14 can utilize a collision-avoidance operation for transmission of the respective responses from the isolated vault 18, for example using Trickle.

The device interface circuit 32 of the edge node "E" 14 in operation 88 can receive the responses from one or more of the confined LLN devices 14 in the isolated vault 18 (identifiable based on the responses specifying the sub-PAN ID "123-4567"), and in response the device interface circuit 32 of the edge node "E" 14 can detect the corresponding wireless link quality value (e.g., a received signal strength indicator (RSSI)) for each response message. The device interface circuit 32 of the edge node "E" 14 in operation 88 also can monitor reception of beacon messages by any of the confined LLN devices 14 that are transmitted as described above with respect to operation 44 of FIG. 4A, and record the associated wireless link quality values (e.g., RSSI values).

The processor circuit 34 of the edge node "E" 14 can record the corresponding wireless link quality value in operation 88, and identify in operation 90 the confined LLN device 14 having the best wireless link quality value to serve as a subroot for an isolated sub-DAG 26 in the isolated vault 18.

In response to identifying the "optimum" confined LLN device "J" 14 as having the best wireless link quality to serve as a subroot in the isolated vault 18, the processor circuit 34 of the edge node "E" 14 in operation 92 can generate and cause the device interface circuit 32 to transmit, using a higher "Vault-Ingress Tx Power Level" that overcomes any attenuation, a sub-DAG root instruction (e.g., a modified unicast DIO message) to the "optimum" confined LLN device "J" 14. The higher "Vault-Ingress Tx Power Level" is sufficient to reach the "optimum" confined LLN device "J" 14 in the isolated vault 18, and typically is substantially higher than the prescribed PAN Tx power level used by the edge node "E" 14 for communicating with its parent network device "B" 14 in the DODAG 20. The instruction, implemented for example as a modified unicast DIO message, can specify the sub-PAN ID "123-4567" allocated to the isolated sub-DAG 26 in the isolated vault 18, and can specify a sub-PAN objective function that is different than the PAN objective function specified in root-initiated DIO messages output the root network device 12. The instruction also can specify the "Vault-Ingress Tx Power Level" used by the edge node "E" 14 for transmitting the instruction into the isolated vault 18.

The instruction transmitted by the edge node "E" 14 to the "optimum" confined LLN device "J" 14 in the isolated vault 18 can cause in operation 94 the identified CG-mesh device "J" to operate as a "vault sub-DAG root" using the objective function specified in the instruction from the edge node "E" 14. Referring to FIG. 4C, the processor circuit 34 of the "optimum" confined LLN device "J" 14 in operation 96 can respond to reception of the instruction from the edge node "E" 14 (e.g., the unicast DIO message) by wirelessly attaching to the edge node "E" 14 as its DODAG parent outside the isolated vault 18. The device interface circuit 32 of the "optimum" confined LLN device "J" 14 in operation 98 can selectively change (e.g., increase) its transmission power from its current intra-vault Tx power 22 to a vault-egress Tx power 24 that is sufficient to reach the parent edge node "E" 14 outside the vault, for example based on determining in operation 98 the signal degradation (100 of FIG. 2B) as the difference between the "Vault-Ingress Tx Power Level" specified in the instruction from the edge node "E" 14 and the detected RSSI value in receiving the instruction from the edge node "E" 14.

Hence, the processor circuit 34 of the "optimum" confined LLN device "J" 14 in operation 98 can set its vault-egress Tx power 24 to be greater than the signal degradation (i.e., attenuation) 100 encountered between the edge node "E" 14 and the isolated vault 18. The processor circuit 34 of the "optimum" confined LLN device "J" 14 in operation 98 can set the transmit power of the device interface circuit 32 to the vault-egress Tx power 24 for each message transmitted to the edge node "E" 14, including DAO messages transmitted by the "optimum" confined LLN device "J" 14 to the edge node "E" 14. As described previously, the instruction from the edge node "E" 14 also can specify one or more parent-child frequency channels to be used by the "optimum" confined LLN device "J" 14 for parent-child communications between the isolated vault 18 and the edge node "E" 14. The instruction from the edge node "E" 14 also can specify one or more intra-vault frequency channels to be used by the confined LLN devices 14 inside the isolated vault 18. The parent-child frequency channels can be different than the wireless channels used for communications within the isolated vault 18.

Hence, the processor circuit 34 of the "optimum" confined LLN device "J" 14 in operation 102, in response to receiving the instruction (e.g., unicast DIO message), can reduce the transmit power of its device interface circuit 32 to the intra-vault Tx power 22 for transmission of an updated DIO message within the isolated vault 18 that specifies the "optimum" confined LLN device "J" 14 as a sub-DAG root for the isolated sub-DAG 26 allocated the sub-PAN ID "123-4567". Hence, the remaining confined LLN devices 14 in the isolated vault 18 can respond to the DIO message output by the "optimum" confined LLN device "J" 14 by attaching to the "optimum" confined LLN device "J" 14, as appropriate, for formation of the isolated sub-DAG 26.

Hence, the edge node "E" 14 can operate as an edge device between the isolated sub-DAG 26 inside the isolated vault 18 and the DODAG 20 that is outside the isolated vault 18. The edge node "E" 14 can maintain full control over establishment of an isolated sub-DAG 26 within an isolated vault 18 by the "optimum" confined LLN device "J" 14 having the best wireless characteristics for reaching the edge node "E" 14. As described previously, the edge node "E" 14 can have multiple wireless transceivers that enable simultaneous communications with different isolated sub-DAGs 26 operating on different frequency channels (and different parent-child frequency channels) within the same isolated vault 18. The edge node "E" 14 also can execute other edge node-specific operations for the assigned isolated sub-DAG 26 in the isolated vault 18, for example border routing operations, security policy enforcement, etc.

According to example embodiments, localized optimization of isolated sub-DAGs in isolated areas enables scalable optimization of isolated "meter farms" based on establishing link layer mesh networks operating at optimized transmission power levels relative to locally-determined density, and based on identifying the best confined LLN device that is capable with communication with an identified edge node outside the isolated area. The example embodiments enable scalable formation of a sub-DAG in the isolated area, eliminating the undesirable effect of a star topology between an edge node and the confined LLN devices 14. The example embodiments enable use of channel hopping techniques within isolated vaults, using for example time-slotted channel hopping (TSCH), 6TiSCH, etc.

The localized optimization also enables distributed optimization of large-scale CG-mesh networks, where the isolated CG-mesh based metering devices 14 in the isolated meter "vault" 18 are part of a large-scale CG-mesh network infrastructure 10 comprising hundreds or thousands of meter "vaults" 18 across a large city in an electrical grid. Hence, a network management device in the CG-mesh based infrastructure (providing electrical grid metering for the large city) can implement localized optimization (via the root network device) based on unicast transmission of a unicast message comprising optimization-related instructions to an edge node device establishing a link-layer connection into an isolated vault 18.

The example embodiments also can include an apparatus comprising a processor circuit and a device interface circuit. The apparatus is implemented as a constrained network device in a low power and lossy network (LLN). The processor circuit is configured for determining a self-estimated density value of neighboring LLN devices based on wirelessly receiving an identified number of beacon message transmissions within an identified time interval from neighboring transmitting LLN devices in the LLN. The processor circuit further is configured for setting a first wireless transmit power value based on the self-estimated density value. The device interface circuit is configured for transmitting a beacon message at the first wireless transmit power value, the beacon message generated by the processor circuit and specifying the self-estimated density value, a corresponding trust metric for the self-estimated density value, and the first wireless transmit power value used by the constrained network device for transmitting the beacon message.

The example embodiments also can include an apparatus comprising a processor circuit and a device interface circuit. The processor circuit is configured for attaching, as a child network device in a data network, to a parent network device of a directed acyclic graph (DAG) rooted by a root network device. The processor circuit further is configured for detecting a plurality of wireless link quality values for messages received from respective low power and lossy network (LLN) devices confined within an isolated area of the data network, where the apparatus is positioned outside the isolated area. The processor circuit further is configured for identifying one of the LLN devices within the isolated area as having a best of the wireless link quality values and associated with a prescribed sub-network identifier, the sub-network identifier allocated to the network device operable as an edge node between the DAG and the isolated area. The device interface circuit is configured for transmitting an instruction, generated by the processor circuit, to the one LLN device within the isolated area to operate as a subroot for the LLN devices within the isolated area.

Although the example embodiments have been described with respect to using RPL for generating a DAG-based network topology, other non-RPL protocols can be used for establishing a network topology (overlying a link-layer mesh) within the isolated area and outside the isolated area.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   determining, by a constrained network device in a low power and lossy network (LLN), a self-estimated density value of neighboring LLN devices based on wirelessly receiving an identified number of beacon message transmissions within an identified time interval from neighboring transmitting LLN devices in the LLN;
   setting, by the constrained network device, a first wireless transmit power value based on the self-estimated density value; and
   transmitting a beacon message at the first wireless transmit power value, the beacon message specifying the self-estimated density value, a corresponding trust metric for the self-estimated density value, and the first wireless transmit power value used by the constrained network device for transmitting the beacon message.

2. The method of claim 1, wherein the constrained network device is confined within an isolated area of the LLN.

3. The method of claim 2, further comprising:
   the constrained network device wirelessly attaching to a parent network device that is positioned outside the isolated area;
   the constrained network device selectively changing its transmit power from the first wireless transmit power value to a second wireless transmit power value for each data packet transmitted to the parent network device;
   the constrained network device resuming the first wireless transmit power value for each data packet transmitted within the isolated area.

4. The method of claim 3, further comprising:
   the constrained network device receiving, from the parent network device, an instruction specifying the constrained network device is to operate as a subroot for LLN devices in the isolated area;
   outputting, by the constrained network device, an advertisement message at the first wireless transmit power value and specifying the constrained network device is the subroot in the isolated area, the advertisement message causing the LLN devices in the isolated area to establish a directed acyclic graph (DAG) rooted at the constrained network device.

5. The method of claim 1, wherein the determining includes:
   determining, from each beacon message transmission, a corresponding estimated density value calculated by the corresponding neighboring transmitting LLN device, a corresponding trust metric allocated to the estimated density value by the corresponding neighboring transmitting LLN device, and a transmit power value used by the corresponding neighboring transmitting LLN device for transmitting the beacon message transmission;
   determining the self-estimated density based on the number of beacon message transmissions within the identified time interval, relative to the estimated density values and respective trust metrics.

6. The method of claim 1, further comprising:
   determining, by the constrained network device, an updated self-estimated density based on wirelessly receiving a second number of beacon message transmissions within a second instance of the identified time interval; and
   setting, by the constrained network device, an updated wireless transmit power value based on the updated self-estimated density value.

7. The method of claim 1, further comprising:
   repeating, by the constrained network device, the determining, setting, and transmitting for each of a plurality of available wireless channels;
   selectively limiting use, by the constrained network device, of the available wireless channels based on the constrained network device detecting a determined higher value in the self-estimated density among one or more of the available wireless channels; and
   generating updated self-estimated density values using successively-increasing identified time intervals.

8. One or more non-transitory tangible media encoded with logic for execution by a machine and when executed by the machine operable for:

determining, by the machine implemented as a constrained network device in a low power and lossy network (LLN), a self-estimated density value of neighboring LLN devices based on wirelessly receiving an identified number of beacon message transmissions within an identified time interval from neighboring transmitting LLN devices in the LLN;

setting, by the constrained network device, a first wireless transmit power value based on the self-estimated density value; and transmitting a beacon message at the first wireless transmit power value, the beacon message specifying the self-estimated density value, a corresponding trust metric for the self-estimated density value, and the first wireless transmit power value used by the constrained network device for transmitting the beacon message.

9. The one or more non-transitory tangible media of claim 8, wherein the constrained network device is confined within an isolated area of the LLN.

10. The one or more non-transitory tangible media of claim 9, further operable for:

the constrained network device wirelessly attaching to a parent network device that is positioned outside the isolated area;

the constrained network device selectively changing its transmit power from the first wireless transmit power value to a second wireless transmit power value for each data packet transmitted to the parent network device;

the constrained network device resuming the first wireless transmit power value for each data packet transmitted within the isolated area.

11. The one or more non-transitory tangible media of claim 10, further operable for:

the constrained network device receiving, from the parent network device, an instruction specifying the constrained network device is to operate as a subroot for LLN devices in the isolated area;

outputting, by the constrained network device, an advertisement message at the first wireless transmit power value and specifying the constrained network device is the subroot in the isolated area, the advertisement message causing the LLN devices in the isolated area to establish a directed acyclic graph (DAG) rooted at the constrained network device.

12. The one or more non-transitory tangible media of claim 8, wherein the determining includes:

determining, from each beacon message transmission, a corresponding estimated density value calculated by the corresponding neighboring transmitting LLN device, a corresponding trust metric allocated to the estimated density value by the corresponding neighboring transmitting LLN device, and a transmit power value used by the corresponding neighboring transmitting LLN device for transmitting the beacon message transmission;

determining the self-estimated density based on the number of beacon message transmissions within the identified time interval, relative to the estimated density values and respective trust metrics.

13. The one or more non-transitory tangible media of claim 8, further operable for:

determining, by the constrained network device, an updated self-estimated density based on wirelessly receiving a second number of beacon message transmissions within a second instance of the identified time interval; and setting, by the constrained network device, an updated wireless transmit power value based on the updated self-estimated density value.

14. The one or more non-transitory tangible media of claim 8, further operable for:

repeating, by the constrained network device, the determining, setting, and transmitting for each of a plurality of available wireless channels;

selectively limiting use, by the constrained network device, of the available wireless channels based on the constrained network device detecting a determined higher value in the self-estimated density among one or more of the available wireless channels; and generating updated self-estimated density values using successively-increasing identified time intervals.

\* \* \* \* \*